Jan. 14, 1958 R. G. ELTON 2,819,664
FILM METERING AND SHUTTER SETTING MECHANISM
Filed Nov. 24, 1953
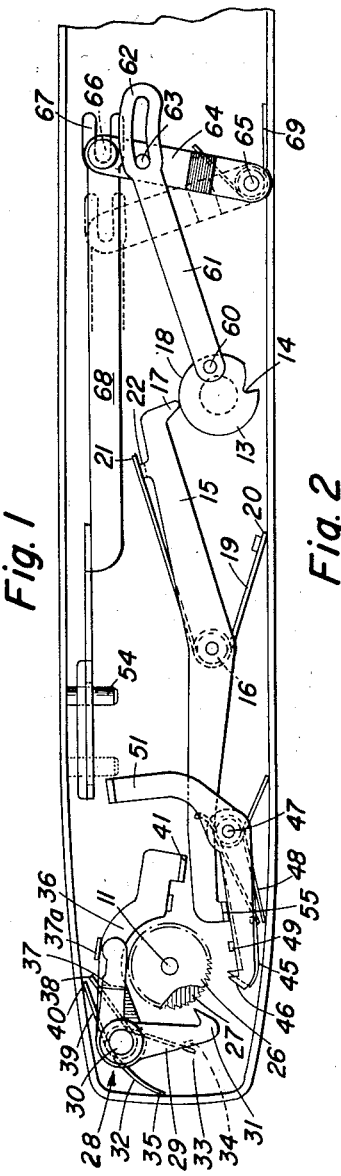
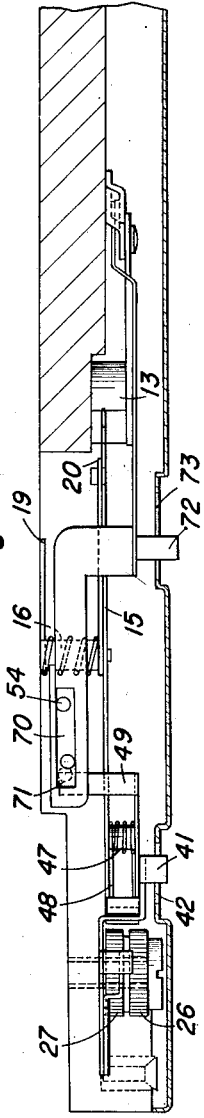
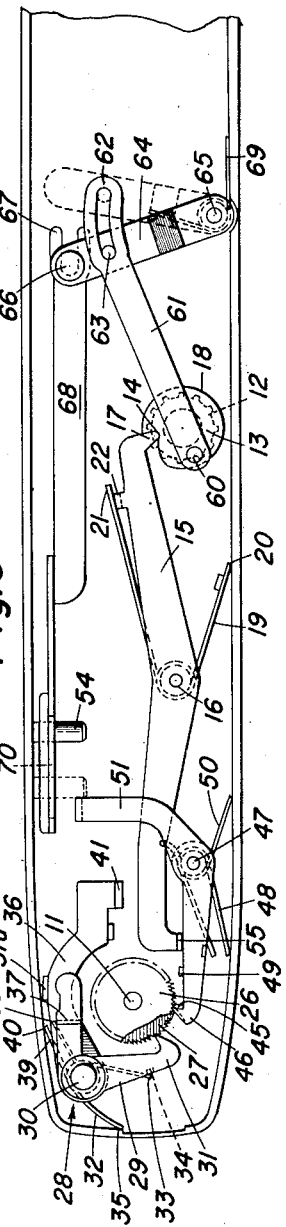
ROBERT G. ELTON
INVENTOR.
BY
ATTORNEYS United States Patent Office 2,819,664
Patented Jan. 14, 1958

2,819,664

FILM METERING AND SHUTTER SETTING MECHANISM

Robert G. Elton, Rochester, N. Y., assignor to Eastman Kodak Company, Rochester, N. Y., a corporation of New Jersey Application November 24, 1953, Serial No. 394,020

7 Claims. (Cl. 95—31)

The present invention relates to roll film cameras, and more particularly to a double exposure prevention device for such cameras.

As is well known in cameras of this type, it is desirable to provide a mechanism which affords an interlock between the film winding mechanism and the shutter activating mechanism by which the initial winding of the film serves to set the shutter, and at the end of the film winding operation the winding mechanism is locked automatically against further activation. The tripping of the shutter is then utilized to release the film winding mechanism. Also, many of these cameras are provided with a reverse locking mechanism so that during the normal film winding, the take-up spindle can be operated only in one direction, as is deemed apparent. However, during the film rewind, this reverse locking mechanism is moved to an inoperative position to free the take-up spindle for reverse rotation.

An object of the present invention is the provision of a novel and simple film metering and shutter setting mechanism.

Another object of the invention is the provision of a mechanism of the class which is simple in structure, easy to operate, rugged, positive in its action, and highly effective in use.

Yet, another object of the invention is the provision of an arrangement for setting the shutter independently of the film winding mechanism so as to enable the making of a deliberate double exposure.

To these and other ends, the invention resides in certain improvements and combiantions of parts, all as will be hereinafter more fully described, the novel features being pointed out with claims at the end of the specification.

In the drawings:

Figure 1 is a plan view of one type of a roll film camera, with the top plate removed, showing the relation thereto of a film metering and shutter setting mechanism constructed in accordance with the preferred embodiment of the invention, the parts being in the film unlocking position to permit rotation of the take-up spindle to wind up the film;

Figure 2 is a rear elevation view of the mechanism illustrated in Figure 1; and

Figure 3 is a view similar to Figure 1, but with the parts in the position to lock the film winding mechanism.

Similar reference numerals throughout the various views indicate the same parts.

As is common and well known practice with roll film cameras, the film strip is wound successively from a supply spool, across an exposure area and is finally wound up on a take-up spool carried by the take-up spindle 11. This spindle may be rotated by the usual well known knob, not shown, or any other suitable operating mechanism. During the passage of the film strip from the supply spool to the take-up spool, the film engages and rotates a film measuring roll 12 to which is secured, for unitary rotation, a metering disc 13 provided with a peripheral slot or notch 14, as best shown in Figures 1 and 3. Roll 12 is of such a size that it, and the disc 13, will make exactly one revolution when the film has been moved the ditsance of one image area, as is deemed apparent.

A metering control lever 15 is pivoted at 16 on the camera body and has an end 17 which is adapted to ride on the periphery 18 of the disc 13 as shown in Figure 1. When the film strip has been moved the distance of one image area, the notch 14 of the disc 13 is moved into registry with the end 17 of lever 15. A coil spring 19 is wrapped around pivot 16 and has one end 20 engaging the camera body, and the other end 21 anchored to a lug 22 on the lever 15 adjacent end 17. This spring 19 serves to rock the lever 15 clockwise to move the end 17 into the notch or slot 14 when the parts are in a position illustrated in Figure 3.

The spindle 11 carries a pair of ratched wheels 26 and 27. A rewind lock mechanism, broadly designated by the numeral 28, is adapted to engage ratchet 26 to prevent reverse rotation of the spindle 11 during normal or forward movement of the film. This rewind lock comprises, in the present embodiment, a bell crank lever 29 pivoted at 30, as shown in Figure 1 and 3. One end of the lever 29 is provided with a pawl 31 adapted to engage ratchet 26 to prevent the reverse rotation of the ratchet, and hence spindle 11. A coil spring 32 is wrapped around pivot 30 and has one end 33 secured to a lug 34 on the lever 29 and the other end 35 anchored to the camera body, and tends to rock bell crank 29 in a counter clockwise direction to move pawl 31 into locking relation with ratchet 26, as shown in Figure 3. A second lever 36 is also pivoted at 30 and is formed with a lug 37 to which one end 38 of a coil spring 39 is attached. The spring 39 is wrapped around pivot 30 and has an end 40 anchored to the camera body. This spring 39 tends to rock lever 36 counter clockwise about pivot 30. The free end of lever 36 is provided with a down-turn lug or ear 41 which extends through a registering opening 42 in the camera body, the purpose of which arrangement will be later more fully described.

A pair of pawls 45 and 46 are pivoted at 47, and the pawl 45 is adapted to be moved into engagement with ratchet 27 by means of a spring 48. Pawl 46 is a form of a bell crank or double armed lever and has an upturned lug or ear 49 adapted to engage pawl 45, as shown. A second spring 50 engages an arm 51 of pawl 46 to the right of pivot 47, and tends to rock pawl 46 clockwise to move pawl 46 and, hence, 45 into engagement with ratchet 27, as deemed apparent. The springs 48 and 50 tend to move pawls 45 and 46 into locking relation with the ratchet 27 to lock the spindle 11 against further rotation. The arm 51 of pawl 46 lies in the path of a shutter setting pin 54. The two pawls 45 and 46 are arranged in staggered relation so that they engage at a half tooth spacing in the teeth of ratchet 27.

When the shutter is set, by means to be later described, the pin 54 is in the right or solid line position shown in Figure 1. When the shutter is tripped, the pin 54 moves to the left or to the dotted position illustrated in Figure 1. Such movement causes pin 54 to engage arm 51 of pawl 46 to rock the latter counter clockwise about pivot 47 to withdraw pawl 46 from engagement with ratchet 27. Such movement of pawl 46 brings lug 49 on pawl 46 into engagement with pawl 45 also to rock the latter counter clockwise and out of engagement with ratchet 27. Thus, the tripping of the shutter causes pin 54 to move both pawls 45 and 46 out of a holding or locking relation with ratchet 27 to free the latter and, hence, the spindle 11 to permit winding of the exposed film area.

The pawls 45 and 46 are then in the position illustrated in Figure 1.

As above described, the end 17 of the lever 15 is positioned in the notch 14 of the disc 13, as shown in Figure 3, at the end of the film winding operation then upon tripping the shutter, the spindle is freed, as mentioned above, and may now be rotated to wind up the exposed image area. Such winding serves to move the film, and to impart a rotation to the film measuring roll 12 and the metering disc 13. Such rotation causes slot 14 to move out of registry with the end 17 of lever 15 and the end 17 is lifted onto the periphery 18 of the disc 13, as shown in Figure 1. Such lifting of end 17 imparts a counterclockwise movement to lever 15 to rock the latter upon its pivot 16 to shift a lug or blocking member 55 into the path of pawls 45 and 46 to prevent reengagement of the latter with the ratchet 27 when the pin 54 is moved into the right in setting the shutter, as will be later described. The rotation of the spindle 11 is continued to wind up the exposed area; and, at the end of the winding operation, the notch 14 is again brought into registry with the end 17 and the spring 19 then rocks the lever 15 clockwise upon its pivot 16. Such rocking moves blocking member 55 out of blocking relation with pawls 45 and 46, and the latter under the action of springs 48 and 50 move clockwise about pivot 47 and into locking relation with the ratchet 27 to lock the spindle 11 against further movement.

In addition to moving the blocking member 55 out of blocking relation, the winding of the film is also utilized to set the shutter. To this end, the disc 13 has eccentrically mounted thereon by means of a pin 60, one end of a crank 61, the other end of which is formed with a curved slotted portion 62 in which is positioned a pin 63 carried by an intermediate portion of a lever 64, one end of which is pivoted at 65 to the camera. The other end of lever 64 carries a pin 66 which is held in a slotted or bifurcated end at 67 of a slide or shutter setting lever 68 by means of a spring 69, as shown in Figures 1 and 3. The left end of lever 68 is formed with an elongated slot 70 in which the shutter setting pin 54 is positioned.

The arrangement is such that when the disc 13 is rotated during the winding of the film, the crank 61 is oscillated to shift levers 64 and 68 to the right from the dotted line position to the solid line position, illustrated in Figure 1. Such rightward movement causes the left end 71 of slot 70 to engage setting pin 54 to move the latter to the right from its dotted to its solid position, illustrated in Figure 1 to set the shutter. Such movement of pin 54 shifts the latter out of holding relation with the arm 51 of pawl 46 so that the latter is now held solely by the blocking member 55 until the end of the winding operation, and at that time, the crank 61 has been returned to the position illustrated in Figure 3. Now, when the shutter is tripped, the pin 54 moves to the left, as viewed in Figure 1, and engages the end 71 of slot 70 to slide lever 68 to the left or to the dotted position shown in Figure 1. Also in its leftward or tripped position, pin 54 engages arm 51 to move the pawls 45 and 46 counter clockwise about pivot 47 and out of holding or locking relation with ratchet 27 to free the spindle 11 for winding. Thus, the tripping of the shutter releases the film winding mechanism, and the operation of the latter sets the shutter.

Because of the above described interlock, neither the film winding nor the shutter tripping mechanisms can be actuated a second time until the other mechanism has first been actuated, thus effectively preventing the making of an inadvertent double exposure. However, there are times when it may be desirable to make a deliberate double exposure. To permit such an operation, the lever 68 is provided with a formed up lug or ear 72 which extends through a registry slot 73 in the camera body. With this arrangement, after the lever 68 has been shifted to the left in tripping the shutter, the lever 68 may again be moved to the right to set the shutter by means of the lug 72 and independently of the film winding mechanism. As this shutter setting has been secured without the winding of the film, the exposed film area has not been wound, and the shutter may again be tripped to make a deliberate double exposure. The slotted end 62 of crank 61 permits this independent rightward move of lever 68 independently of the winding mechanism and disc 13, as will be deemed apparent from Figure 3.

In many types of cameras, the exposed film is positioned in a camera into which the film is rewound after the last exposure. In order to so rewind the film, the spindle 11 must be rotated in a direction opposite to that used in winding the film after each exposure. As above described, the spindle 11 is normally held against such reverse rotation by means of the pawl 31 which engages the ratchet 26. Therefore, it is deemed apparent that in order to rewind the film back onto the spool, the pawl 31 must be moved out of holding or locking relation with ratchet 26.

To secure this result, the lug 41 is grasped and moved downward, as viewed in Figure 1, to impart a clockwise movement to lever 36. Such movement will cause the lug 37a to engage the right end of the bell crank 29 to impart a clockwise movement thereto and to move pawl 31 out of holding relation with ratchet 26. The parts are then in a position shown in Figure 1, and the spindle 11 is free and may be rotated reversely to rewind the exposed film strip back into the cassette of container.

It will be apparent from the above description that the present invention provides a novel film metering and a shutter setting mechanism in which the film winding mechanism is locked automatically at the end of the film winding operation, and the winding of the film sets the shutter. The tripping of the shutter then serves to release the film locking mechanism to permit the winding of the exposed film area. Thus, the interlock between the shutter and winding mechanism prevents the inadvertent operation of one of the mechanisms until the other has been actuated, thus preventing an inadvertent or accidental double exposure. However, a deliberate double exposure can be easily and quickly made when so desired. Also, the take up spindle is freed from reverse rotation to permit rewinding of the film strip.

While one embodiment of the invention has been disclosed, it is apparent that the inventive idea may be carried out in a number of ways. Therefore, the present invention is not to be limited to the precise details described, but is intended to cover all variations and modifications which fall within the scope of the appended claims.

What I claim is:

1. In a roll film camera, the combination with a film take-up spindle for winding up a film strip and on which the film is wound, a ratchet on said spindle, a setting-type shutter, a slidable plate operatively connected to said shutter to set the latter, of means engageable with said ratchet to lock said spindle against operation, means controlled by said plate for moving said locking means out of engagement with said ratchet to release the latter, blocking means controlled by said film and movable into the path of said released means to hold the latter in released position, and means controlled by the film for moving said plate in one direction to set said shutter.

2. In a roll film camera, the combination with a film take-up spindle for winding up a film strip and on which the film is wound, a ratchet on said spindle, a setting-type shutter, a slidable plate operatively connected to said shutter to set the latter, of means engageable with said ratchet to lock said spindle against operation, means controlled by said plate for moving said locking means out of engagement with said ratchet to release the latter, blocking means controlled by said film and movable into the path of said released means to hold the latter in released position, means controlled by the film for moving said blocking means out of blocking relation with said locking means to free the latter for movement into locking relation with said ratchet, and means controlled by said film strip for moving said plate in one direction to set said shutter.

3. In a roll film camera, the combination with a film take-up spindle for winding up a film strip and on which the film is wound, a ratchet on said spindle, a setting-type shutter, a slidable plate operatively connected to said shutter to set the latter, of means engageable with said ratchet to lock said spindle against operation, means controlled by said plate for moving said locking means out of engagement with said ratchet to release the latter, blocking means controlled by said film and movable into the path of said released means to hold the latter in released position, and means controlled by said film both for moving said blocking means out of blocking relation with said locking means to free the latter for movement into locking relation with said ratchet and for moving said plate in one direction to set said shutter.

4. In a roll film camera, the combination with a film take-up spindle for winding up a film strip and on which the film is wound, a ratchet on said spindle, a setting-type shutter, a slidable plate operatively connected to said shutter to set the latter, of means engageable with said ratchet to lock said spindle against operation, means controlled by said plate for moving said locking means out of engagement with said ratchet to release the latter, blocking means controlled by said film and movable into the path of said released means to hold the latter in released position, means controlled by the film for moving said blocking means out of blocking relation with said locking means to free the latter for movement into locking relation with said ratchet, and means including a crank operatively connected to said plate and controlled by said film to shift said plate in one direction to set said shutter during the winding of the film strip.

5. In a roll film camera, the combination with a film take-up spindle for winding up a film strip and on which the film is wound, a ratchet on said spindle, a setting-type shutter, a slidable plate operatively connected to said shutter to set the latter, of means engageable with said ratchet to lock said spindle against operation, means controlled by said plate for moving said locking means out of engagement with said ratchet to release the latter, a rotatable metering disk controlled by said film, a pivoted lever controlled by said disk, a blocking member controlled by said film and movable into the path of the released locking means to retain the latter in released position, and means including a crank connecting said disk to said plate to shift the latter in one direction to set said shutter during the winding of said film.

6. In a roll film camera, the combination with a film take-up spindle for winding up a film strip and on which the film is wound, a ratchet on said spindle, a setting-type shutter, a slidable plate operatively connected to said shutter to set the latter, of means engageable with said ratchet to lock said spindle against operation, means controlled by said plate for moving said locking means out of engagement with said ratchet to release the latter, a rotatable metering disk controlled and rotated by said film during the winding thereof, a pivoted lever, a blocking member formed on one end of said lever, means on the other end of said lever cooperating with said disk to pivot said lever in one direction to move said blocking member into the path of said released locking means to retain the latter in released position, means for rocking said lever in the opposite direction to move said blocking member out of blocking relation with said locking means to free the latter for movement into locking relation with said ratchet, a pivoted arm connected to said plate, and a crank connecting said disk and said arm to rock the latter to shift said plate in one direction to set said shutter when said disk is rotated by the film being wound.

7. In a roll film camera, the combination with a film take-up spindle for winding up a film strip and on which the film is wound, a ratchet on said spindle, a setting-type shutter, a slidable plate operatively connected to said shutter to set the latter, of means engageable with said ratchet to lock said spindle against operation, means controlled by said plate for moving said locking means out of engagement with said ratchet to release the latter, blocking means controlled by said film and movable into the path of said released means to hold the latter in released position, means controlled by the film for moving said plate in one direction to set said shutter, and additional means independent of said film for moving said plate in said one direction to set said shutter.

References Cited in the file of this patent

UNITED STATES PATENTS

| | | |
|---|---|---|
| 675,781 | MacDonald | June 4, 1901 |
| 2,148,636 | Muller et al. | Feb. 28, 1939 |
| 2,206,105 | Mihalyi | July 2, 1940 |
| 2,301,956 | Kuppenbender et al. | Nov. 17, 1942 |
| 2,418,594 | Morse et al. | Apr. 8, 1947 |
| 2,559,880 | Kesel et al. | July 10, 1951 |
| 2,663,234 | Hodges | Dec. 22, 1953 |

FOREIGN PATENTS

| | | |
|---|---|---|
| 677,135 | Great Britain | Aug. 13, 1952 |